United States Patent [19]

Fowers

[11] Patent Number: 4,993,793
[45] Date of Patent: Feb. 19, 1991

[54] MACHINE FOR SPLITTING AND CONTROLLING A LIGHT BEAM

[76] Inventor: Michael B. Fowers, 26943 Lakewood Way, Hayward, Calif. 94544

[21] Appl. No.: 351,802

[22] Filed: May 15, 1989

[51] Int. Cl.⁵ .......................................... G02B 26/10
[52] U.S. Cl. ..................................... 350/6.9; 350/6.1; 350/6.7
[58] Field of Search ................... 350/6.1, 6.4, 6.7, 6.8, 350/6.9, 6.91, 311, 319, 169, 438; 250/203.3, 203.4, 235, 236; 358/206, 474, 481

[56] References Cited

U.S. PATENT DOCUMENTS

| | | | |
|---|---|---|---|
| 3,534,162 | 10/1970 | Hannappel et al. | 350/6.7 |
| 4,118,619 | 10/1978 | McArthur | 219/121.7 |
| 4,611,881 | 9/1986 | Schmidt et al. | 350/6.9 |
| 4,637,680 | 1/1987 | Kuwabara | 350/6.8 |
| 4,699,447 | 10/1987 | Howard | 350/6.9 |
| 4,710,621 | 12/1987 | Loy | 250/203 |
| 4,714,960 | 12/1987 | Laakmann | 358/206 |
| 4,764,672 | 8/1988 | Wu | 250/236 |

*Primary Examiner*—Bruce Y. Arnold
*Assistant Examiner*—Loha Ben

[57] ABSTRACT

A machine for producing multiple beams of light from a single beam of light having at least one light beam source, device to direct the light beam source upon a single or multiple faced rotating reflective or refractive surface which then sweeps the beam repeatedly outward with an annular displacement of 360 degrees or less, and a plate containing openings which is disposed so as to intercept the rotating reflected beam and allow light to pass only through the openings in the plate effectively reshaping the angularly displaced beam into multiple beams. A control system is provided which may be incorporated into the machine, if desired, which uses shutter device and an electronic control system for selection and recall of beams produced by the machine. Reflective or refractive surfaces are provided inside the machine which direct the produced beams to a convenient position. Three embodiments are described including a version which produces multiple beams which emanate from the machine in an orderly row, a version which may be mounted overhead and produces beams in a 360 degree displacement, and a version which rests upon a table.

11 Claims, 13 Drawing Sheets

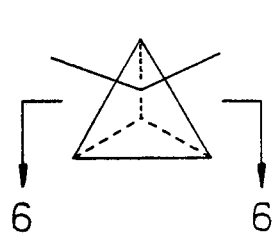
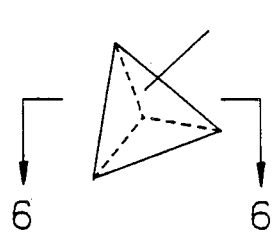
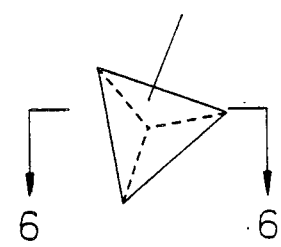
Fig. 18A　　　Fig. 18B　　　Fig. 18C
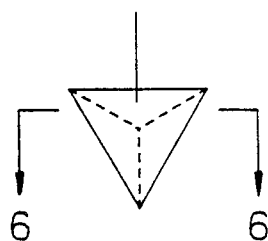
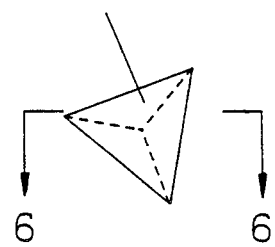
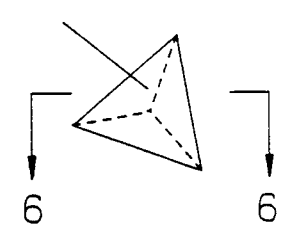
Fig. 18D　　　Fig. 18E　　　Fig. 18F

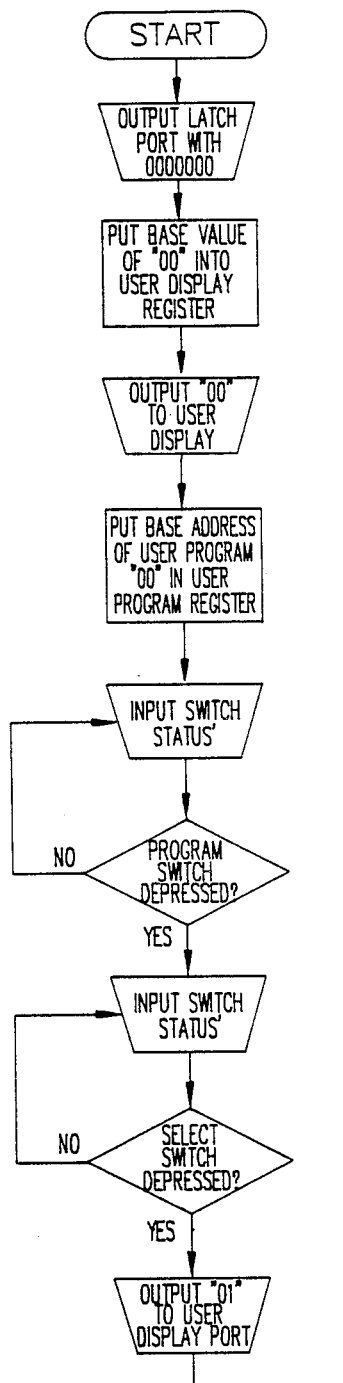
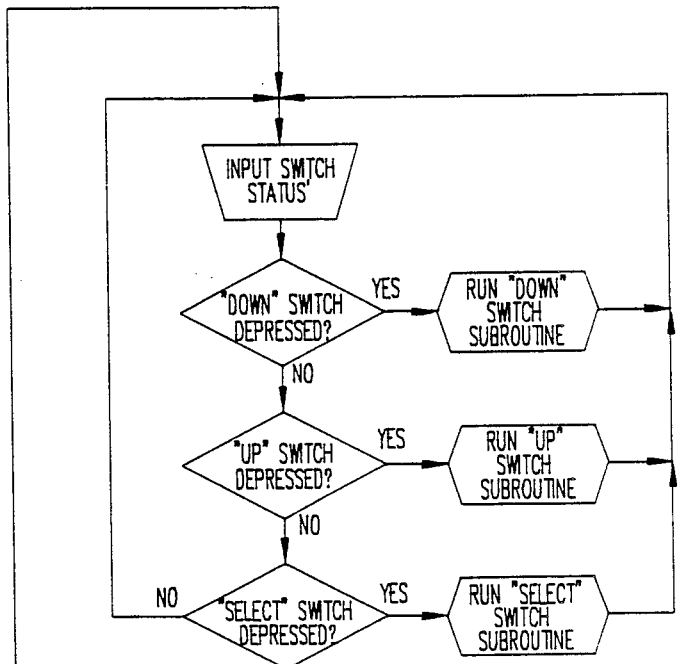
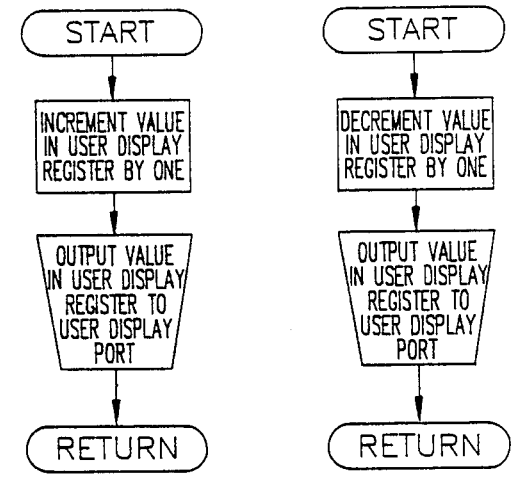
Fig. 20B   Fig. 20C
Fig. 20A

MACHINE FOR SPLITTING AND CONTROLLING A LIGHT BEAM

BACKGROUND—FIELD OF THE INVENTION

This invention relates to light beam control apparatus, specifically machinery to distribute, shape, and control the beam.

BACKGROUND—DESCRIPTION OF PRIOR ART

Previous methods of beam splitting have been to use partially silvered mirrors or partially silvered prisms to create multiple beams. While experimenting with many common laser appliances it became obvious to me that if one desired a common laser beam to be split into many beams, it would become cumbersome and entirely impractical to split the beam with conventional beamsplitting mirrors or beamsplitting prisms. This method of beamsplitting has two major disadvantages which my machine overcomes:

1) If one wishes to split one laser beam into two or more beams of equal intensities, many special mirrors and mirror holding apparatus are required.
2) If one has a setup which, for example, splits one beam into 5 beams, and one desires to change this setup by even 1 beam, say to 4, and keep equal light intensities, a new setup must be employed.

The following example demonstrates the impracticality of conventional beamsplitting: A laser beam is directed at a mirror which is partially transmissive and partially reflective and arranged at an angle which reflects part of the beam off of the mirror and lets part of the beam pass straight through. If three beams of equal intensity are desired, the first mirror should be only 33.3% reflective. This will reflect a beam of one third of the intensity of the original beam. The rest of the beam, or two thirds of the original beam, which passes through the partially silvered mirror is then directed through another similarly oriented mirror which is 50% reflective, producing two other beams equal to one third of the intensity of the original beam.

If the operator of the setup wishes to change the amount of light beams in the previous setup example to four, the first mirror must be 25% reflective, a second 33.3% reflective, and the last being 50% reflective—thus another special mirror and additional optical holders etc. must be added to make use of the setup.

With optical equipment generally being small, lightweight, and fragile, changing the setup in the usual manner becomes a tedious and cumbersome procedure for the operator of the setup. With any of the embodiments shown in the figures, light beams of equal intensity may be turned on or off with simply the push of a button.

OBJECTS AND ADVANTAGES:

1) Control and ease of adjustment of the number of light beams split from a single beam in an optical system.
2) Intensity of the beams produced being independent of the number of beams desired by the operator.
3) Ease in changing the setup of an optical system.
4) Great improvement in time of changing the amount of beams split in an optical system.
5) Reliability of operation due to only two simple moving parts.

BRIEF DESCRIPTION OF THE DRAWINGS

FIG. 18 is an illustration of the three-sided reflective surface which is described in the specification and it's interaction with a beam of light at angles of rotation from 0 to 120 degrees.

FIG. 20A is a system operation flowchart for the example electronic control system given.

FIG. 20B is the "up" switch subroutine flowchart.

FIG. 20C is the "down" switch subroutine flowchart.

LIST OF REFERENCE NUMERALS

24—electric motor (all)
26—"standoff" type mounting

28—motor shaft (all)
30—base plate (embodiment 1)
32—multifaceted rotating reflective surface (embodiment 1)
34—aperture plate (embodiment 1)
36—aperture
38—light control assembly (all)
38A—magnet coil
38B—armature
38C—armature stop
40—directional mirror assembly (embodiment 1)
40A—reflective surface
40B—directional mirror assembly mounting bracket
40C—machine screw
42—upper machine housing assembly
42A—upper machine housing assembly (embodiment 1)
42B—beam exit port window (embodiment 1)
44—lower machine housing assembly (embodiment 1)
44A—lower machine housing
44B—entrance port window
46—light source housing assembly
48—electronics pcb (all)
50—base plate (embodiment 2)
52—aperture plate (embodiment 2)
54—directional mirror assembly (embodiment 2 & 3)
54A—reflecting surface
54B—reflecting surface mounting plate
54C—position locking screw
54D—assembly mounting bracket
56—support tubes
58—clear dust cover (embodiment 2)
60—dust cover support flange
62—light source housing assembly (embodiment 2)
64—lower machine housing assembly (embodiment 2)
66—rotating mirror (embodiments 2&3)
68—base plate (embodiment 3)
70—light source housing & lower cover assembly (embodiment 3)
72—adjustable stand
74—light beam alignment mirror assembly
74A—assembly frame
76—clear dust cover (embodiment 3)
78—light source mounting means
80—light source
82—connection cable between electronics pcb and light control assemblies

DESCRIPTION OF THE PREFERRED EMBODIMENTS

Figure 3:
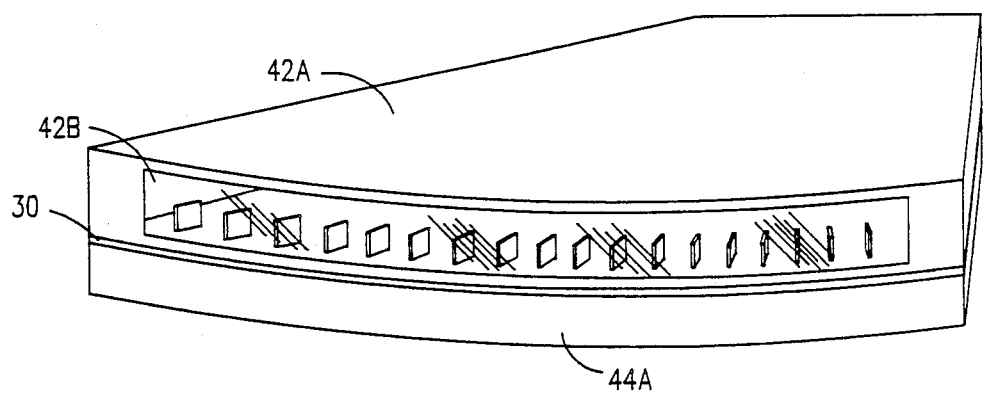
FIG. 3 is a front perspective view of embodiment #1 of the complete machine for producing multiple beams constructed in accordance with the present invention.

The first preferred embodiment of the present invention is illustrated in FIGS. 1-9. This embodiment will herefoth be referred to as embodiment #1. FIG. 3 illustrates embodiment #1 complete with upper machine housing assembly 42A, beam exit port window 42B and lower machine housing assembly 44A. These parts are attached to base plate 30. Housing assemblies 42A and 44A are preferably formed of sheet metal of thickness no greater than 1/16", which is cut and welded to form the housings as shown in the drawings; however, any rigid substance may be substituted, as the purpose of the housing assemblies are only to provide the machine's internal parts with protection from external elements. Housing assemblies 42A and 44A are bolted to base plate 30 with typical hardware. Beam exit port window 42B may be of any substance which allows a desireable amount (or type) of light to pass through it while allowing no dust to pass into the machine. Beam exit port window 42B may also be made of a substance which acts as a filter and allows only certain wavelengths of light to pass through, or a filter material which allows only a portion of the light incident upon it to pass through. Beam exit port window 42B is made larger than the opening in upper housing assembly 42A and is attached to the inside of upper housing assembly 42A with any type of permanent glue by applying the glue to the overlapping area of window 42B.

Base plate 30 is preferably made of steel of thickness no greater than 1/8", but may be made of any material of sufficient thickness so as to provide a rigid means of fastening all of the parts of the machine. The dimensions of base plate 30 will vary with the desired number of beams to be produced.

Figure 4:
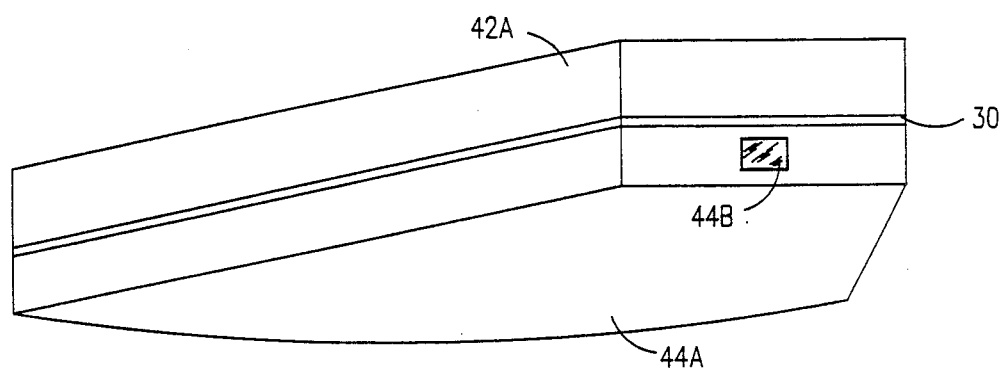
FIG. 4 is a rear perspective view of embodiment #1 of the complete machine for producing multiple beams constructed in accordance with the present invention.

FIG. 4 shows the preferred embodiment at a rear perspective angle illustrating the beam entrance port window 44B. This window, attached to lower housing assembly 44A, should be constructed of a transparent or translucent material so as to cause as little reflectivity of light incident upon its surface as possible. Window 44B is made larger than the opening in lower machine housing assembly 44A and is attached to the inside of housing assembly 44A with any type of permanent glue by applying glue to the overlapping edges of window 44B.

Figure 5:
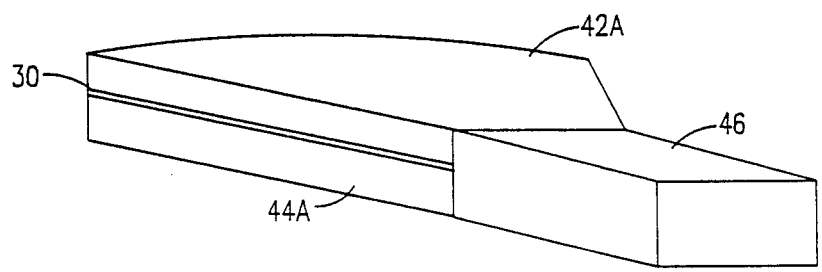
FIG. 5 is a rear perspective view of FIG. 4 showing the attachment of a typical light source housing assembly.
Figure 6:
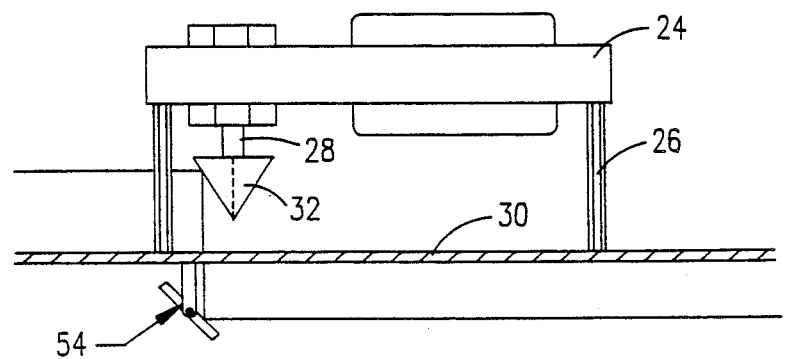
FIG. 6 is a cross sectional view taken along line A—A of FIG. 1

FIG. 5 shows the first preferred embodiment with a typical light source housing assembly 46 attached. This light source housing assembly is preferably made of sheet metal of thickness no greater than 1/16", but again, its material may be substituted for any material which provides adequate protection from external elements. Housing assembly 46 is bolted to base plate 30 with typical hardware.

Figure 1:
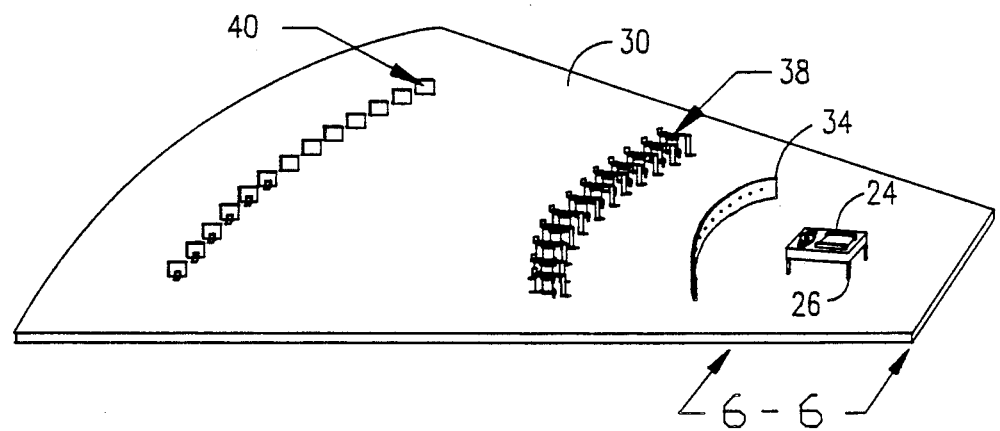
FIG. 1 is a perspective view of the top of the main assembly of the preferred embodiment (embodiment #1) of the machine for producing multiple beams of light constructed in accordance with the present invention.
Figure 2:
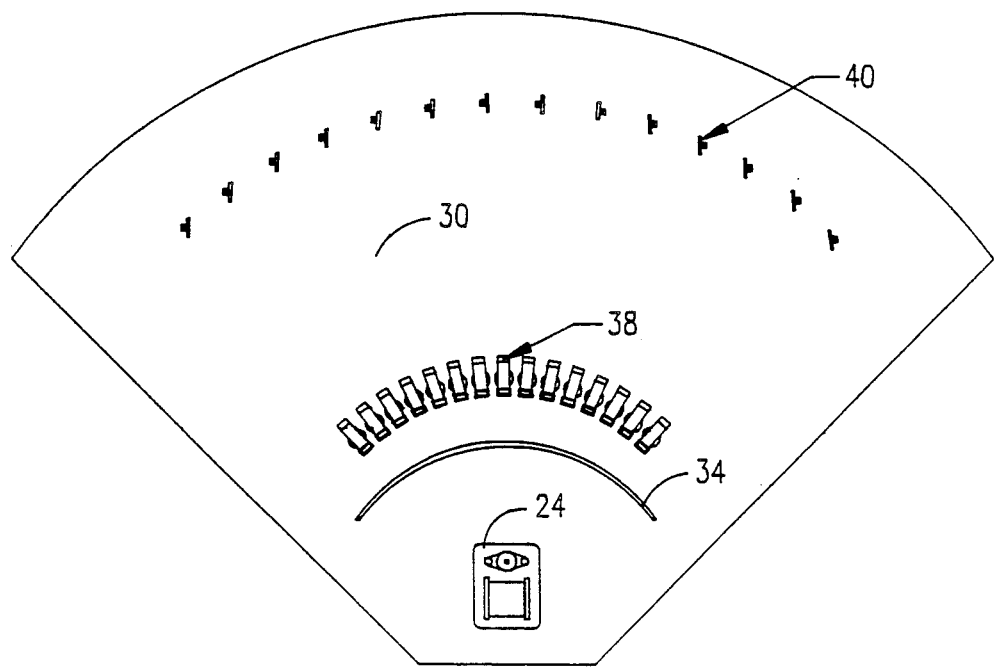
FIG. 2 is a top elevational view of the main assembly of embodiment #1 of the present invention.

FIG. 1 illustrates the main assembly of the first preferred embodiment. The parts illustrated here form the functional machinery of the embodiment and exemplify the heart of the machine. Electric motor 24 provides rotational motion for the three-faced rotating reflective surface 32 which cannot be viewed from this angle but is shown in detail in FIG. 6. Any electric motor may be used here which provides enough power to rotate reflective surface 32. A household ceiling fan motor has proved to be adequate in this application and is shown in the drawings as such. Motor 24 is mounted to base plate 30 (previously described) with "standoff" type mountings 26. Reflective surface 32 is constructed in the shape of a three sided pyramid and may be made of any material which provides reflectivity or refractivity of either all wavelengths of light or a particular wavelength of light which is incident upon its surface.

A piece of sheet metal 34 of thickness not exceeding 1/32" with a plurality of openings is mounted to base plate 30 as shown so that the plate 34 openings align with the beam of light which reflects off of reflecting surface 32. This plate will be hereafter referred to as "aperture plate 34". Aperture plate 34 is constructed of flat sheet metal which is "punched" with openings at desired intervals and is attached to base plate 30 and held in a "semi-circle" shape by typical machine screws inserted through holes provided in base plate 30 and tabs provided on aperture plate 34.

A plurality of light control (shutter) mechanisms 38, equal in number to the amount of openings in aperture plate 34 are bolted to base plate 30 through holes provided in base plate 30. The light control mechanism 38 is shown in detail in FIG. 8. Each light control mechanism 38 is disposed on base plate 30 in a manner which aligns the highest edge of the armature 38B with an opening in aperture plate 34.

Figure 8:
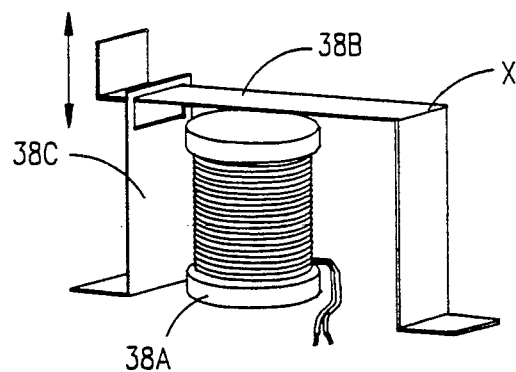
FIG. 8 is a perspective view of an electrically operated light control (shutter) mechanism.

FIG. 8 illustrates light control mechanism 38. Magnet coil 38A consists of a magnetic core material which can be either solid or of formed ferrite, wrapped with typical magnet wire. The gauge of the magnet wire is not critical, however use of a larger gauge wire than No. 22 of the American Wire Gauge Standard is not necessary. Armature 38B consists of sheet metal of thickness not exceeding 1/16" which is a metal such as iron or steel with a relative permeability rating greater than one but less than 6000. The following factors should be considered in choosing the relative permeability of the metal used for armature 38B:

1) A sheet metal with a relative permeability rating which allows armature 38B to be attracted to magnet coil 38A with enough electromagnetic force (EMF) so that armature 38B moves its entire allowed range (either from top to bottom or from bottom to top) within armature stop 38C within 1/20th of one second or less should be employed.

2). The relative permeability of the metal chosen is also dependant on the magnet coil core material and the amount of ampereturns used in the construction of magnet coil 38A. These factors must be taken into consideration when calculating for movement of armature 38B within a specific time.

3) The relative permeability of the metal used should also be one which will not become permanently magnetized by repeated or long term use of the magnet core. Once the metal has been chosen, it is then bent at appropriate points to form armature 38B as pictured in FIG. 8. The bend at point X should be made so that when the assembly 38 is constructed as shown, armature 38B will be held against armature stop 38C as shown. Armature stop 38C is made from sheet metal not exceeding 1/16" in thickness and has an opening as shown in FIG. 8 in which the armature 38B rests as shown. The metal chosen for armature stop 38C should be of a low relative permeability, preferably lower than 50 so that the armature stop does not become permanently magnetized, or a substance other than metal may be substituted. The light control mechanism 38 may be bolted to base plate 30 with typical machine screws or by attachment with any type of permanent glue.

Referring back to FIG. 1, a plurality of directional mirror assemblies 40 are mounted to base plate 30 in a manner which aligns the mirror assemblies 40 with the openings 36 in aperture plate 34 and light control mechanisms 38. Please refer to the previous description of the directional mirror assemblies 40 and FIG. 2 for a top view of the main assembly of FIG. 1. This drawing illustrates how the previously described components are aligned with each other along the light path.

Figure 9:
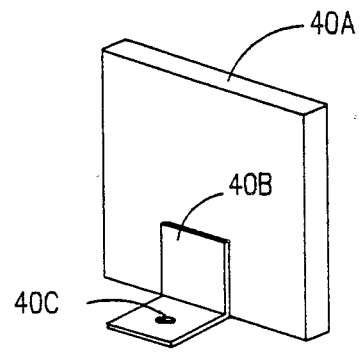
FIG. 9 is a perspective view of a directional mirror assembly which is adjustable.

Directional mirror assemblies 40 are shown in detail in FIG. 9. These assemblies consist of a reflecting surface 40A which is attached to a piece of sheet metal 40B of thickness no greater than 1/16" which has a mounting hole punched for a typical machine screw to be fastened through such as 40C. The piece of sheet metal has been bent at 90 degrees and fastened to the reflecting surface with any type of permanent glue. Reflecting surface 40A may be made of any substance which will reflect or refract any wavelength of light which is incident upon its surface or a particular wavelength of light which is incident upon its surface.

Figure 7:
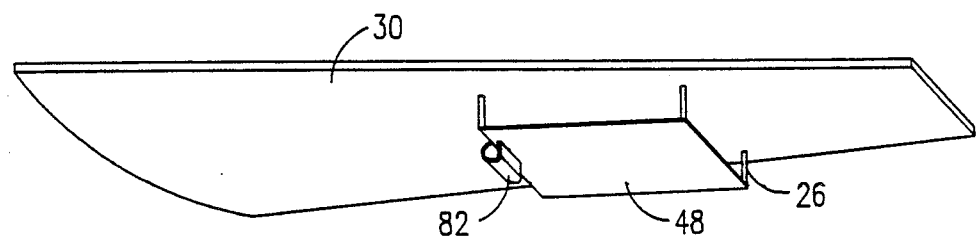
FIG. 7 is a perspective view of the bottom printed circuit board mounting detail of the main assembly shown in FIG. 1.

FIG. 7 illustrates the mounting of the printed circuit board 48 on the underside of the main assembly plate 30 with "standoff" type mounting 26. Connection between printed circuit board 48 and light control assemblies 38 is made with a typical multi-conductor cable 82.

The electronic printed circuit board 48 contains the microprocessor, "glue logic", diodes and transistors which drive the light control coils 38A. Due to the simplicity of the electronic control, virtually any system which incorporates a microprocessor and a small amount of "glue logic" will be more than adequate to run the machine and it will be shown in the next section (Operation of Invention) that anyone skilled in the art will easily be able to design a system as good as or better than the example given here. A sample electronic control system is included here. Please note that this same electronic system may be implemented for all of the embodiments of this machine.

Sample electronic system: (please refer to FIG. 19) A panel for operator control is connected to the electronic printed circuit board through a wire cable.

Panel: The panel contains an input/output port expander chip such as the Intel 8255A, two standard 7 segment light emitting diode displays, display driver chip, six momentary type pushbutton switches, and a printed circuit board to connect all of these components in a manner which complies with the schematic diagram of FIG. 19.

Main electronics printed circuit board: The main control board contains a microprocessor chip such as the Intel 8080, a standard ROM, PROM, EPROM, or EEPROM type main memory chip, a standard dynamic RAM chip, a dynamic RAM refresh chip, (with costs of electrically erasable PROM memories dropping, it may become desireable to implement this type of memory instead of RAM), battery back-up circuit, a standard latch chip, standard NPN type transistors such as 3904 for "driving" the magnet coils of each of the light controls, standard diodes such as 4936 for elimination of "inductive kickback" of each of the magnet coils, a standard in line pin type connector for electrical connection between transistors, diodes and magnet coils, and a printed circuit board for connection of these components in a manner which complies with the schematic diagram of FIG. 19.

Figure 11:
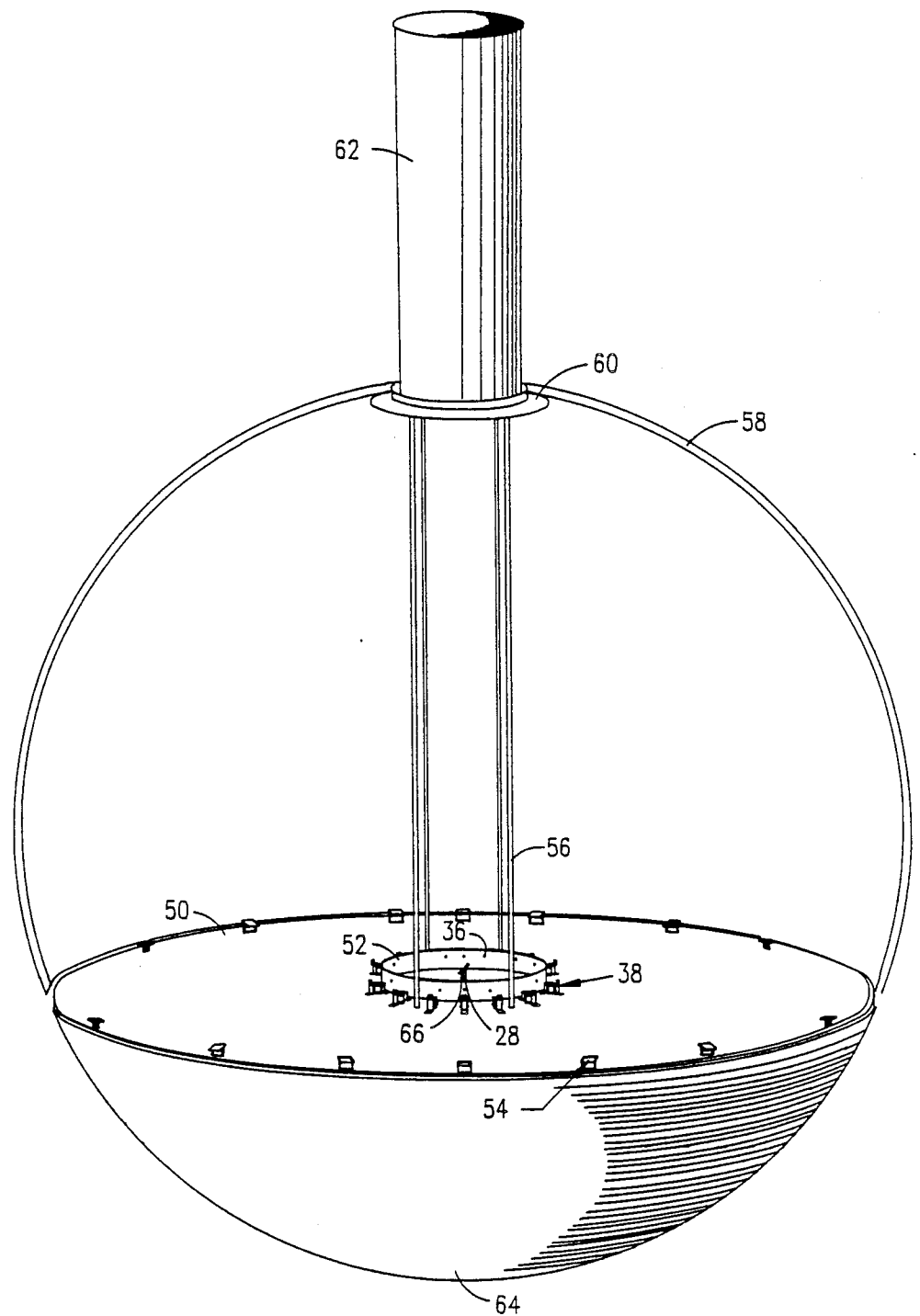
FIG. 11 is a general perspective view of embodiment #2 of the machine for producing multiple beams of light constructed in accordance with the present invention.
Figure 15:
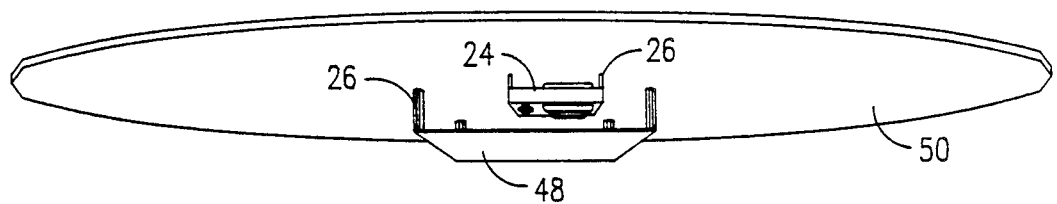
FIG. 15 is a perspective bottom view of the main assembly of embodiment #2 showing motor and printed circuit board mounting detail.

FIG. 11 illustrates a second embodiment of the present invention. Single-faced reflective surface 66 is attached to motor shaft 28 of the same electric motor 24 which has been previously described. Electric motor 24 is mounted to the underside of base plate 50 with "standoff" type mountings 26 (see FIG. 15 for mounting detail). Reflective surface 66 may again be any surface which provides reflectivity or refractivity of either all wavelengths of light or of a particular wavelength of light which is incident upon its surface.

Figure 12:
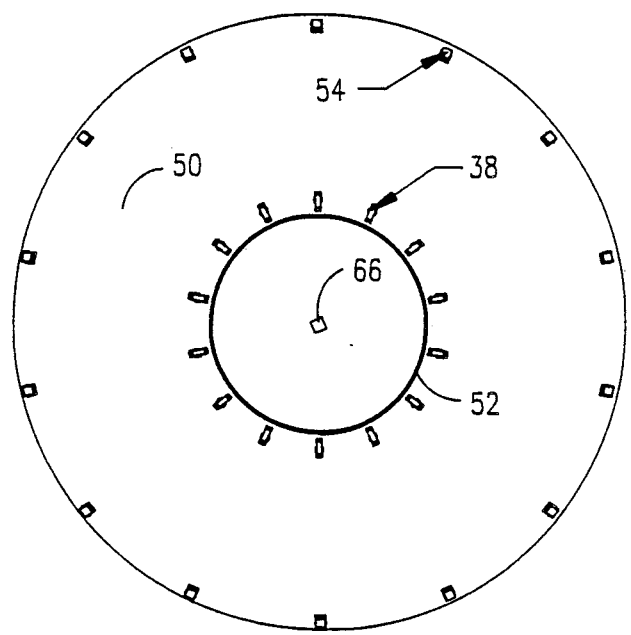
FIG. 12 is a top elevational view of the main assembly of embodiment #2.

Base plate 50 is identical in material and thickness to base plate 30, previously described, only it is shaped as shown in FIG. 12. A piece of sheet metal 52 of thickness not exceeding 1/32" with a plurality of openings 36 is mounted to base plate 50 as shown. This plate is identical to plate 34 (previously described) except that it is arranged as a "ring" to fully intercept the beam of light reflected off of reflective surface 66 as reflective surface 66 rotates. This plate will be hereafter referred to as "aperture plate 52". Aperture plate 52 is made of flat sheet metal which is "punched" with openings at desired intervals. Its ring shape is attained and held by bolting it to base plate 50 with typical machine screws through holes provided in base plate 50 and tabs provided on plate 34.

A plurality of light control mechanisms 38, (previously described) equal in number to the amount of openings in plate 52 are bolted to base plate 50 with typical hardware through holes provided in base plate 50. Each light control mechanism 38 is disposed on base plate 50 in a manner which aligns the highest edge of the armature 38B with an opening in plate 52. Please refer to FIG. 12 (embodiment 2 main assembly top view) for ease in viewing alignment of parts along the light paths.

A plurality of directional mirror assemblies 54 are bolted to base plate 50 with machine screws through holes provided in base plate 50 and mirror assembly mounting bracket 54D in a manner which aligns the mirror assemblies 54 with the openings in plate 52 and light control mechanisms 38.

Figure 10:
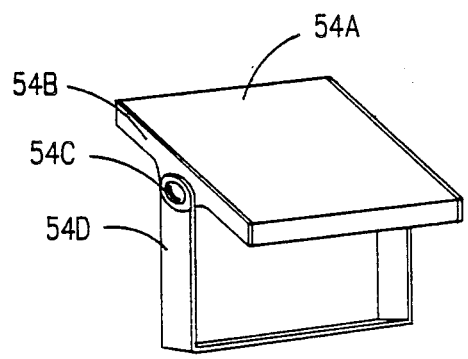
FIG. 10 is a perspective view of a directional mirror assembly which has different mounting means than that of FIG. 9 and is adjusted differently than the assembly shown in FIG. 9.

FIG. 10 illustrates directional mirror assembly 54. Reflecting surface 54A is attached to reflecting surface mounting plates 54B with any type of permanent glue. Assembly mounting bracket 54D is attached to reflecting surface mounting plates 54B with position locking screws 54C. Reflective surface 54A may be any surface which is reflective or refractive, either at all wavelengths of light, or at a specific wavelength of light. Reflective surface mounting plates are constructed of fat sheet metal of thickness no greater than 1/16" and are shaped as shown with an extended tab and tapped hole to allow position locking screw 54C to be attached. Assembly mounting bracket 54D is similarly made of flat sheet metal of thickness no greater than 1/16" which is bent 90 degrees in two places so as to attain the shape shown in FIG. 10. Four holes are also provided in assembly mounting bracket 54D, two for allowance of position locking screws 54C, and two for mounting of the assembly to base plate 50 with machine screws through holes provided in base plate 50. The parts described in the preceding five paragraphs constitute the main assembly of embodiment 2 of the present invention and encompass the heart of the machine.

Referring back to FIG. 11, base plate 50 is attached to light source housing assembly 62 with support tubes 56. Support tubes 56 are preferably made of steel of thickness no greater than 1/16" and outside diameter no larger than ⅜". Support tubes 56 are then inserted into holes in base plate 50 and light source housing assembly 62 which are large enough to accommodate the insertion. Support tubes 56 are then welded to base plate 50 and to light source housing assembly 62.

Figure 13:
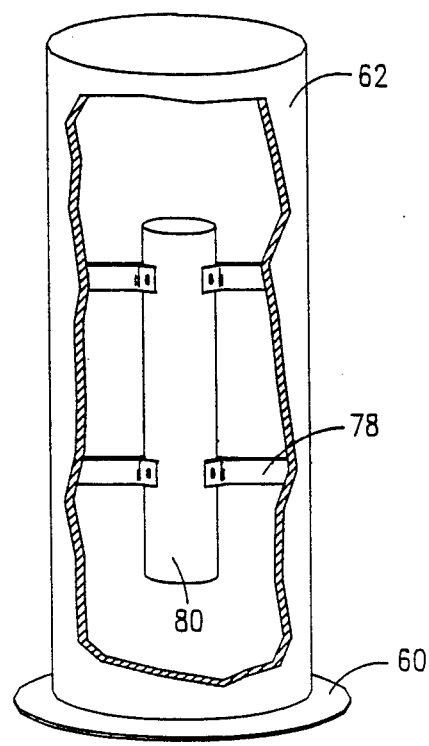
FIG. 13 is a cutaway view of a typical mounting for a light source within the light source housing assembly which is shown in FIG. 11.

Light source housing assembly 62 is made preferably of steel of thickness no greater than 1/16" and is made with various holes and mounting means to accommodate different light sources. FIG. 13 illustrates a cutaway view of the light source housing assembly 62 showing a fixed mount system 78 holding a typical light source 80. This is the preferred method of mounting, however, an adjustable mounting system may be desireable to employ.

Referring back to FIG. 11, dust covering 58 is attached to light source housing assembly support flange 60 via threaded studs which are welded to support flange 60. Dust covering 58 is provided with holes to accommodate the studs on support flange 60. Support flange 60 is a steel sheet metal extension of light source housing assembly 62 no greater in thickness than ⅛" and is welded to housing assembly 62. Dust covering 58 should be of preferably clear material such as plastic or glass of thickness no greater than ⅛", however, since dust covering 58 has an ornamental purpose as well as a functional purpose, it may be desireable to implement a substance which acts as a filter to one or many wavelengths of light and accordingly looks non-clear or opaque to the human eye while transmitting a high percentage of the wavelength of light beams emanating from within the machine. Accordingly, dust covering 58 should not be limited to a clear material.

The preferred shape of dust covering 58 is as shown in FIG. 11. This shape, when mounted on the machine, creates a "global" shaped embodiment in combination with the lower housing assembly 64. The shape of dust covering 58 requires that the piece be molded and it is because of this that plastic is the best choice of material for this piece. Lower housing assembly 64 is manufactured in the usual way by stamping or rolling sheet metal into the form shown in FIG. 11. Lower housing assembly 64 is bolted to base plate 50 with standard machine screws through tabs with holes in housing assembly 64 which align with holes provided in base plate 50.

Figure 17:
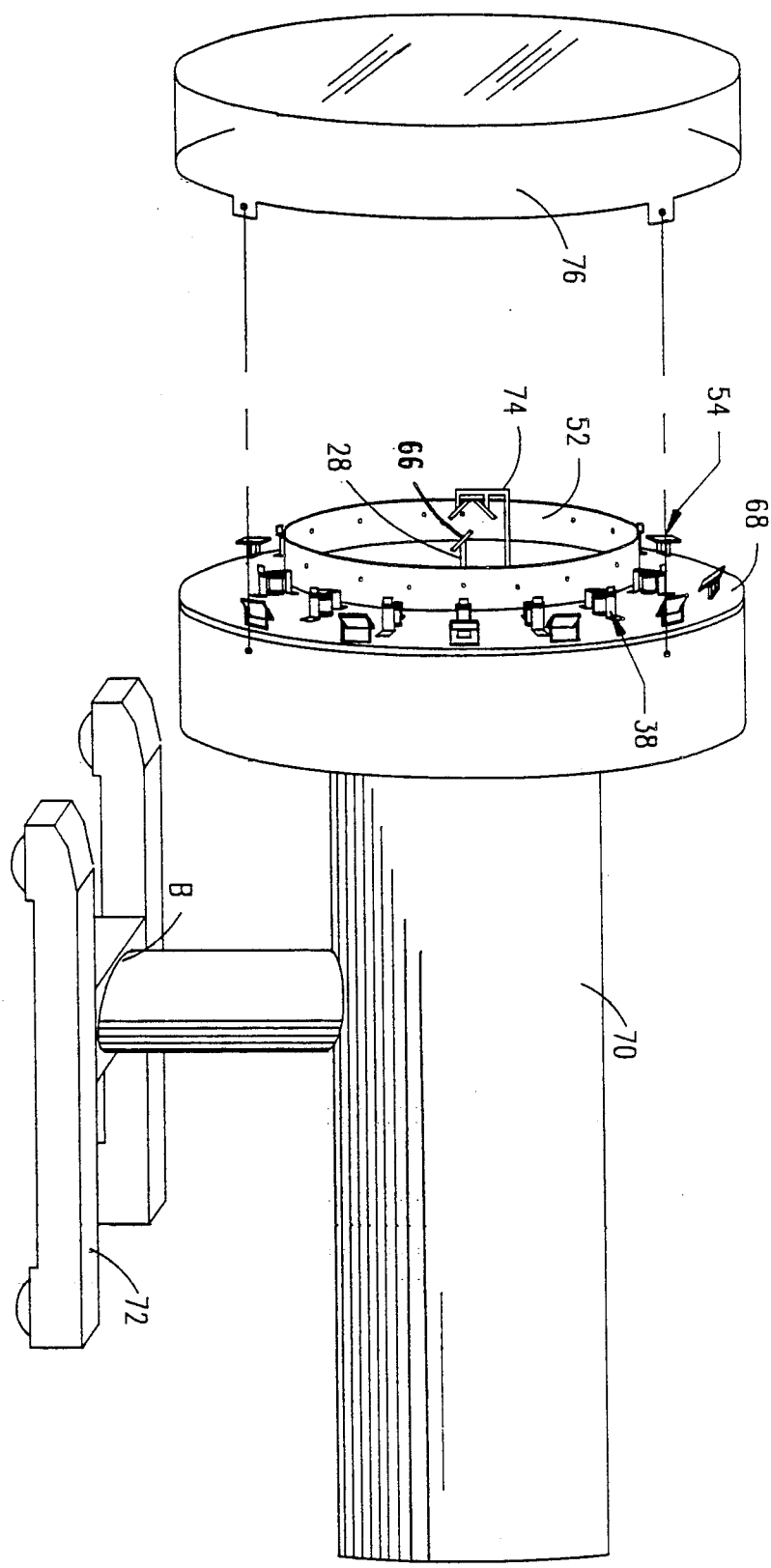
FIG. 17 is an illustration of embodiment #3 of the machine for producing multiple beams of light constructed in accordance with the present invention.

FIG. 17 illustrates a third embodiment of the present invention. This version uses virtually the same main assembly as that of the embodiment shown in FIG. 11. Base plate 68 is exactly the same as base plate 50 (previously described) in material and thickness except that it is smaller in diameter. Aperture plate 52 is the exact same plate as used on the previous embodiment. Similarly, this embodiment uses the same light control means 38 and directional mirror assemblies 54 as in the previous embodiment. In this embodiment however, the light source beam is directed from the light source housing assembly 70 through an opening in base plate 68. This beam must be directed toward reflecting surface 66. Beam alignment mirror assembly 74 accomplishes this task.

Figure 16:
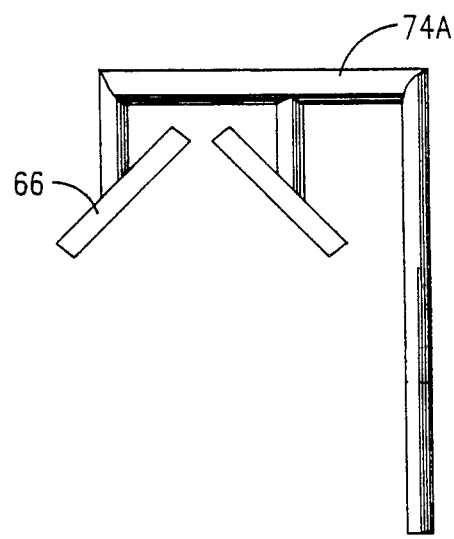
FIG. 16 is an illustration of the beam alignment mirror assembly used in embodiment #3.

Beam alignment mirror assembly consists of pieces of ⅛" steel or aluminum rod 74A which is cut and welded into the shape shown in FIG. 16. Ends on which reflective surfaces 66 are attached, are ground at 45 degree angles and reflective surfaces 66 are attached to the angled rod ends with any type of permanent glue. Beam alignment mirror assembly 74 may then be press fit or welded into an opening provided in base plate 68.

Light source housing assembly 70 encloses the underside of the main assembly in this embodiment. Assembly 70 is constructed of flat sheet metal preferably of thickness no greater than 1/16" which is cut, formed, and welded together to form the assembly as shown in FIG. 16.

A molded plastic or glass dust covering 76 of thickness no greater than ⅛" which is provided with tabs which allow mounting to light source housing assembly and lower machine cover assembly 70. For convenient use, a stand 72 which allows adjustment at point B is included.

Please note that the preceding embodiments were designed to serve the following functions: embodiment 1 produces beams which emanate from the machine in an orderly row; embodiment 2 may be overhead mounted and produces beams in a 360 degree displacement; embodiment 3 may be placed upon a table.

OPERATION OF INVENTION-MECHANICAL

It will be shown herein that all of the embodiments of the present invention operate in the same manner. Before description of operation of the machine however, it is necessary to describe the operation of the light control mechanisms 38 and directional mirror assemblies 40 and 54.

Light control assembly 38 is shown in FIG. 8. Armature 38B is bent during construction at point X so that when positioned as shown in FIG. 8, it will hold itself against armature stop 38C as shown, under a small amount of tension. As electric current is applied to the coil wires of magnet coil 38A, a magnetic field is generated. This magnetic field attracts armature 38B toward the core of magnet coil 38A causing a downward movement as indicated by a downward head of the arrows. Armature 38B moves downward until reaching the bottom of armature stop 38C where it is held against armature stop 38C until electric current ceases to flow in magnet coil 38A. Upon cessation of current flow through magnet coil 38A (and subsequent magnetic field cessation), armature 38B moves upward and back to its original position.

FIG. 9 illustrates directional mirror assembly 40. This assembly is designed to be a permanently locked assembly. The assembly is bolted to base plate 30 with machine screws, and adjusted, using the machine screw hole as the axis point, to deflect a beam to a desired position. A drop of paint or nail polish is then applied between base plate 30 and assembly mounting bracket 40B, and the machine screw tightened. Once the paint dries, the assembly is permanently locked to the base plate at the adjusted position.

FIG. 10 illustrates directional mirror assembly 54. This assembly is designed to be either adjustable or permanently locked. Upon loosening locking screws 54C, reflecting surface 54A and mounting plates 54B can pivot about locking screws 54C. Once the assembly is positioned, locking screws 54C may be tightened and a drop of paint may be applied at the junction of mounting bracket 54D, mounting plates 54B, and locking screws 54C to permanently lock the assembly.

Figure 14:
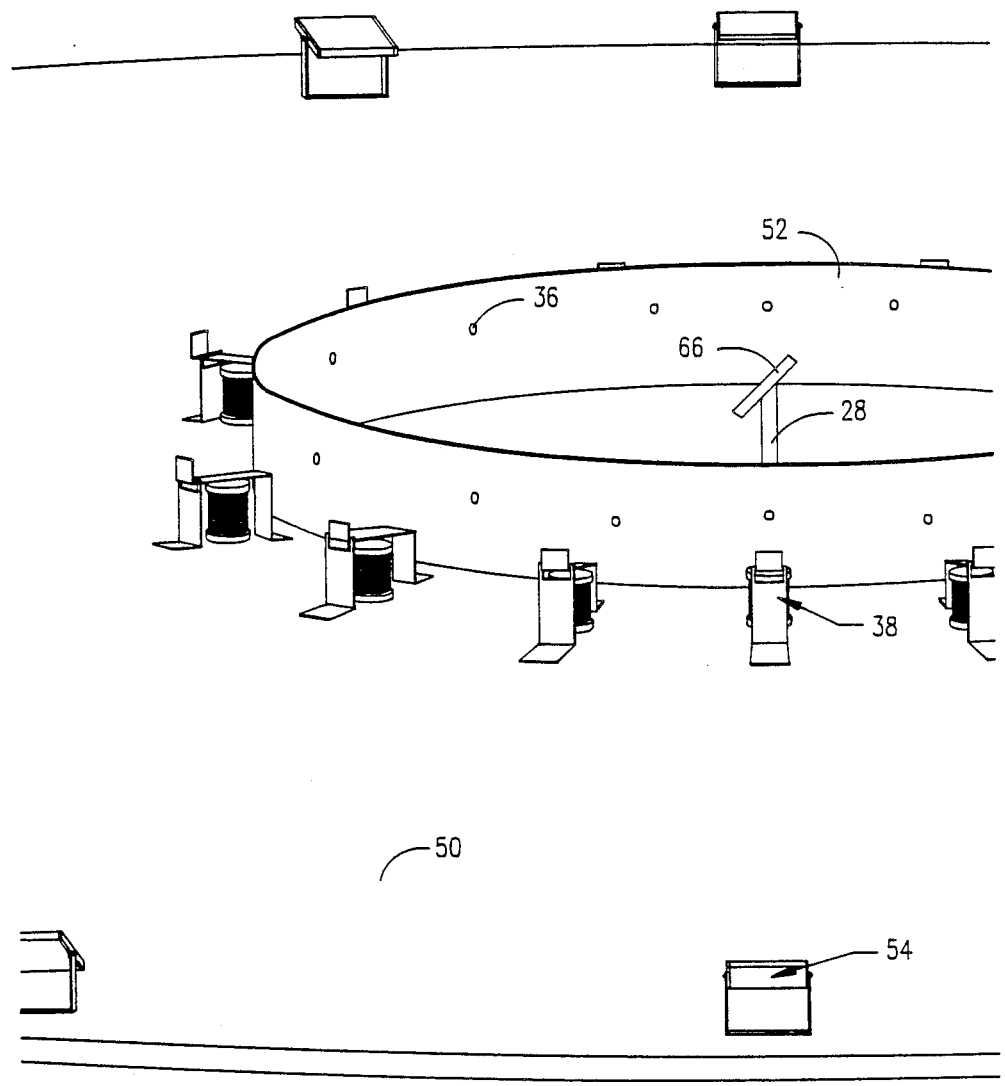
FIG. 14 is a special "light path" detail illustration showing alignment of the various parts of the main assembly of embodiment #2 along the reflected light path.

Operation of the machine can now be easily understood. Please refer to FIGS. 11 and 14. FIG. 14 is a special "light path" close up drawing of the parts which comprise the heart of the machine. Operation is as follows: A light beam from light source 80 held within housing assembly 62 is directed straight downward onto reflecting surface 66 which is rotating on motor shaft 28. Reflecting surface 66 is oriented on motor shaft 28 at exactly 45 degrees. The beam of light is then directed toward plate 52 and is swept fully around the inner surface of plate 52 repeatedly. Plate 52 fully stops this light beam from passing beyond it, except at openings 36, which are aligned with the position of the light beam which is reflected off of reflective surface 66. It is at these openings where light from the reflected beam is allowed to pass beyond plate 52. If the openings 36 are of round shape and at least slightly smaller than the beam which is being swept around plate 52 as shown in FIGS. 11 and 14, the reflected beam (which appears as a line around the inner surface of plate 52) will be "reshaped" into separate beams which emanate from any openings 36 in plate 52 which are aligned with the reflected beam as previously described. It is in this manner that one beam of light is made into multiple beams, and light control mechanisms 38 and directional mirror assemblies 54 simply control and direct the beams of light produced in the manner previously described.

In FIGS. 11 and 14, each light control mechanism 38 is situated on base plate 50 so that the highest edge of armature 38B blocks light emanating from each opening 36 in plate 52. When electricity is applied to the magnet coil 38A, armature 38B moves downward allowing light to pass beyond the mechanism.

Directional mirror assemblies 54 are mounted on base plate 50 and aligned so that each assembly is aligned along the light path of a particular opening 36 in plate 52 so that they direct any light beams which pass beyond the light control mechanisms 38 to a convenient position. FIG. 12 illustrates the alignment orientation of the main assembly of the machine.

Referring to FIG. 17, embodiment 3 operates in exactly the same manner as the previous description, only beam alignment mirror assembly 74 has been added to bring the beam from the light source (encased in enclosure 70) in the rear of the machine through an opening provided in base plate 68. Please refer to FIG. 16 for greater detail on beam alignment mirror assembly 74. This beam alignment is accomplished with two reflecting surfaces 66 positioned at 45 degree angles as shown in FIGS. 16 and 17. This assembly effectively turns the light source beam around 180 degrees, and positions the beam onto the rotating reflective surface 66 which is attached to motor shaft 28. Operation hereforth is exactly the same as previously described for embodiment 2 using the same aperture plate 52, light control mechanisms 38 and directional mirror assemblies 54. Base plate 68 differs from base plate 50 (on embodiment 2) only in diameter. With a clear understanding of embodiments 2 and 3, the operation of the preferred embodiment (1) can now be easily understood.

Please refer now to FIGS. 1, 2, 6, and 18 for mechanical operation of the preferred embodiment. The only difference in the operation of the preferred embodiment from that of the other two is the use of the tri-faced rotating reflective surface 32. This element is, as previously described, a three sided pyramid-shaped reflective surface which is used simply to make more efficient use of the distribution of the light as it is reflected, since the overall intensity of light incident upon a particular area by a rotating reflective surface is the result of the time of exposure of the area to the time that the area is not exposed.

The design of the preferred embodiment is intended to direct the produced beams of light out of the front of the machine in an orderly row, and a reflective surface which rotates the beam 360 degrees as the previously described embodiments, is dis- advantageous since it "wastes" light intensity where it is not needed. The tri-faced reflective surface 32 sweeps the beam of light over a limited angular range and directs the beam only where it is needed and at the same time increases the overall intensity of light which is incident upon the aperture plate surface 34. This is accomplished by directing the beam of light from the light source upon the reflective surface 32 at a distance which is offset from the axis of rotation and in the direction of the surface to be illuminated while keeping the beam fully upon the reflecting surface. Please refer to FIG. 18.

FIG. 18 shows a top view of the tri-faced reflective surface 32 and a light beam directed upward towards the viewer at various angles of rotation (0 through 120 since the process repeats at 120 degrees). To illustrate the distribution of the light beam from a light source, this illustration shows reflective surface 32 rotating on an imaginary center axis. The view shown represents a top view of the setup shown in FIG. 6 with only the reflective surface 32, and light beam shown for clarity. The light beam is shown directed upward toward the angled surfaces of reflective surface 32 just as in the side view sectional illustration of FIG. 6. The light beam is represented with a thick line. The offset of the beam can be seen from this view and it can also be easily seen how the beam is directed through the reflective surface's 120 degree rotation. This process sweeps the light beam across aperture plate 34 every 120 degrees of rotation instead of 360 degrees with a single-faced reflective surface thus tripling the on/off ratio previously described.

As the beam is swept across plate 34 by reflective surface 32, the light will be blocked from passing beyond the plate except at openings 36, which are aligned with the reflected beam as in the previous embodiments. Plate 34 and openings 36 "reshape" the beam as in the previous embodiments and the "reshaped" beams are controlled by light control mechanisms 38 which are aligned in the same manner as the previous embodiments. The reshaped beams are then directed out of the machine at a convenient angle by directional mirror assemblies 40.

Please note that the preceding embodiments serve the following functions: embodiment 1 produces beams which emanate from the machine in an orderly row; embodiment 2 may be overhead mounted and produces beams in a 360degree displacement; embodiment 3 may be placed upon a table.

OPERATION OF INVENTION-ELECTRICAL/ELECTRONIC (FOREWORD)

The electronic system is for user control of the light control mechanisms 38. The system is intended to control the light control mechanisms 38 in the following manner:

1) User selection of the on/off condition of any of the produced beams via the light control mechanisms 38.
2) The ability of the electronic system to electronically store multiple on/off conditions of any of the produced beams of light for the purpose of recalling the user selected conditions at a later time.
3) The ability of the electronic system to produce a recognizable display which corresponds with each stored combination of on/off conditions of the produced beams of light.

OPERATION-ELECTRONIC CONTROL SYSTEM- USER OPERATION

Part A—Definitions

User Program—A location in computer memory where the user variable on/off status of the various beams is stored. This program also has a number designated to it which is displayed by the user display.

System Program—The microprocessor program or program codes located in system memory, which cause the system to operate in a specific manner.

User Display—The two 7-segment light emitting diodes which display various machine status information.

Program Select Mode—Mode of operation in which the up or down option switches will allow the user to scroll through the various user programs. The user display also shows a corresponding number which represents the user program which may be currently selected.

Beam Select Mode—Mode of operation in which the up or down option switches will allow the user to scroll through all of the possible number of produced beams for the purpose of changing the on/off status of any of the produced beams. The user display also shows a corresponding number which represents the beam which may be currently selected.

System memory—The electronic system's non-volatile memory which may be of read only memory (ROM), programmable read only memory (PROM), erasable programmable read only memory (EPROM), or electrically erasable programmable read only memory (EEPROM).

User Memory—The electronic system's volatile memory in which user selected variable data is stored. This memory is dynamic random access memory (DRAM) with refresh circuitry and battery back-up for keeping information in the DRAM memory chip for approximately three years when no power is applied to the machine.

Figure 19:
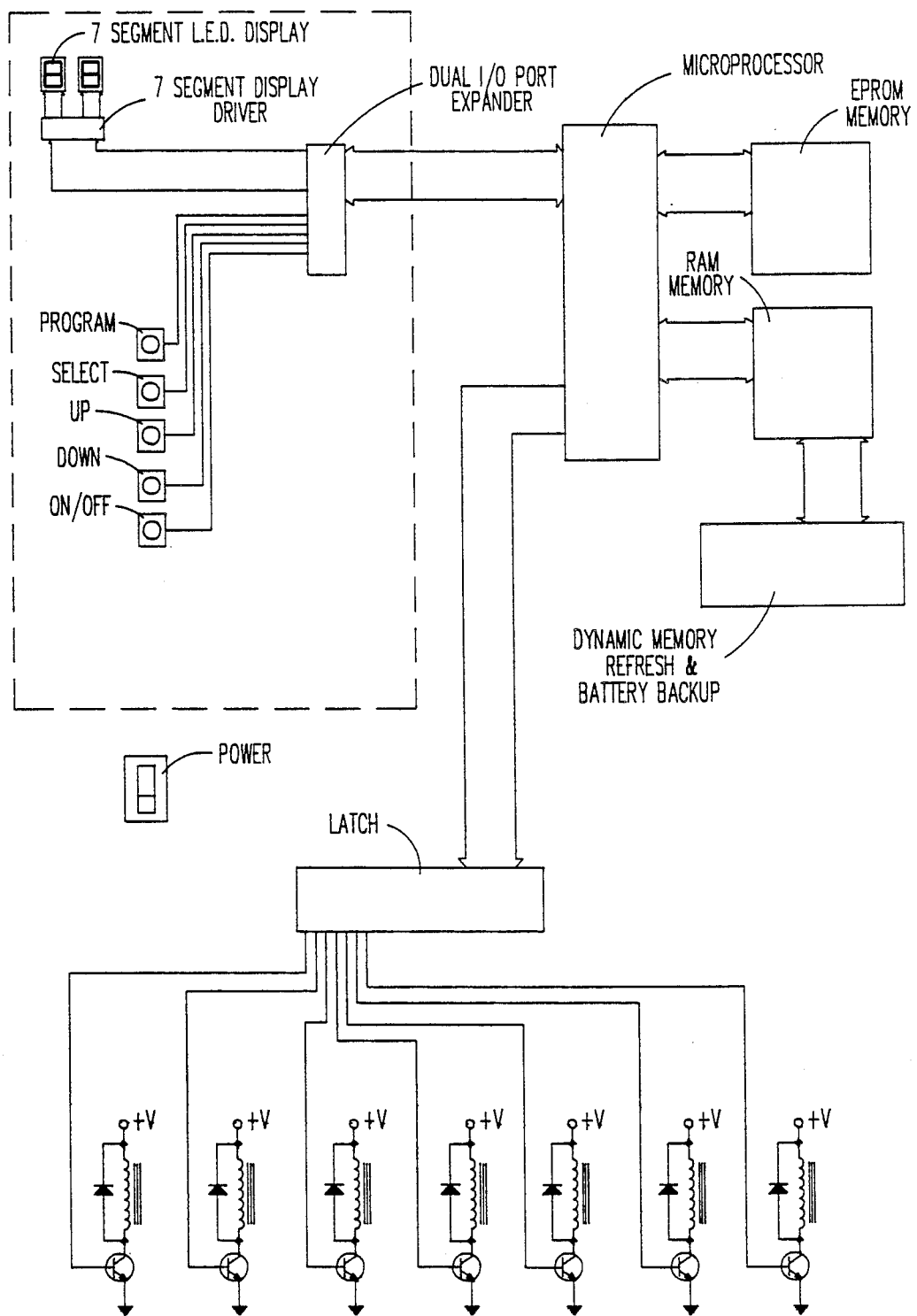
FIG. 19 is a schematic block diagram of the electronic control system which may be used on all embodiments.
Figure 21:
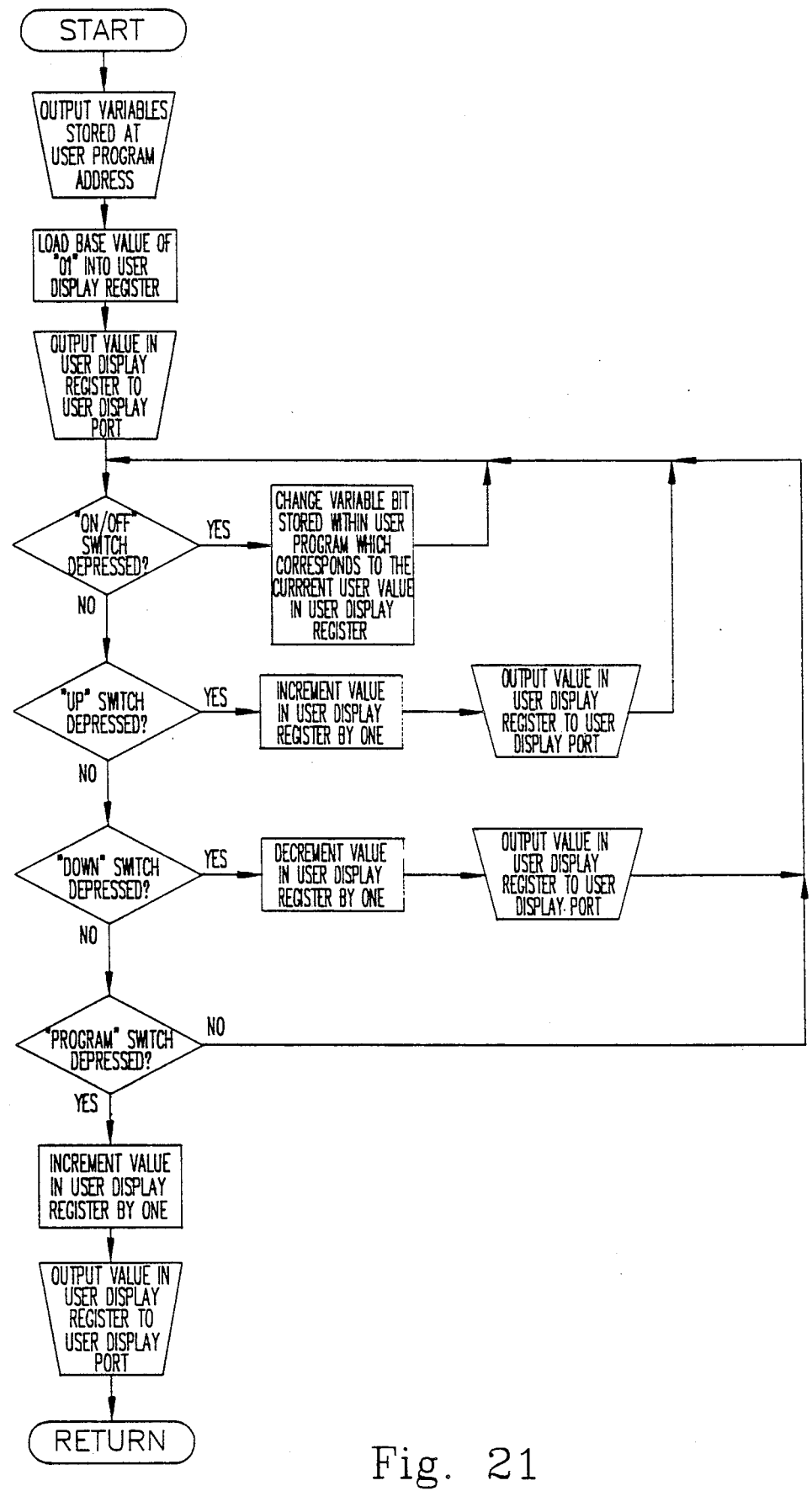
FIG. 21 is a continuation of the flowchart of FIG. 20, particularly the "select" subroutine.

Part B—User Operation Please refer to the electronic control system schematic block diagram FIG. 19. The user of the machine has option switches Program, Select, Up, Down, and On/Off available to control the machine. A visual display consisting of two 7-segment light emitting diodes (the user display) is also employed.

Upon the application of power to the system by the user, The electric motor rotates and the user display shows the numbers 00. As explained to the user in the owner's manual, the number 00 indicates the special machine initialization program in which all produced beams of light are in an "off" status. This program may also be selected by the user when it is desireable to turn off all of the produced beams while keeping the machine power on. The user may now select a user program by depressing the program switch and the select switch. Depression of these two switches, in order, puts the system in program select mode. The user can now select programs 01 through 99 by scrolling in a froward or backward direction by depressing either the up or down switches. The user display will correspondingly increase or decrease it's displayed number showing the user which program which may be selected.

When the user comes upon a desired program number, the select switch is again depressed, and any user selected conditions of the produced beams that were previously set into the program are recalled. The user display also changes it's display to 01 indicating to the user that the machine is now in beam select mode and that beam number one may now be modified. The up or down switches may now be depressed- scrolling backwards or forwards through the amount of beams which the machine is able to produce ie. if the machine is designed to produce 10 beams, the user can now scroll through these beams by number which is indicated on the user display.

If the user desires to change the on/off status of one of the beams, this is done by simply depressing the on/off switch when the display reads the desired number.

When the user desires to keep the on/off conditions which are present within a user program, the program switch is depressed and the machine is once again in program mode and the status of the produced beams are stored in user memory which is provided with a standard battery back-up refresh circuit which can store the variables of the user programs for approximately three years with no power applied to the machine.

ELECTRONIC CONTROL SYSTEM-ELECTRONIC OPERATION

Please refer to the system program flowcharts in FIGS. 20A, 20B, 20C and 21. Upon the application of power to the machine by the user, the microprocessor is directed to a "start up" routine through the standard method of using a circuit to hold the reset pin of the microprocessor active for the time required by the microprocessor to direct itself to a "startup" routine in system (ROM, PROM, EPROM or EEPROM) memory. The microprocessor is then directed to a routine in system memory which quickly replaces any random data in the latch chip (which controls the light control mechanisms 38 as will be described later in this section) with data which will keep all of the light control mechanisms 38 off and output information to the port which the display driver chip is connected which will display "00" on the 7 segment user display.

The system program of the microprocessor then continually reads the port to which the five momentary switches are attached until the program and select switches are depressed by holding the system in a "loop" until these two switches are depressed. These momentary switches toggle between a logic level high voltage and a logic level low voltage. The series of five switches represent a binary code which is read by the microprocessor and acted upon by system program routines. When a switch is depressed by the user, the microprocessor reads this number and is directed to a program routine or subroutine.

As previously described, the user display shows the numbers 00 to the user upon power up. This display represents the user program number and indicates that the system is in program select mode.

Information about each user program is stored in the user memory (RAM). The system program now directs the microprocessor to constantly read the port with the switches and accepts an input from either the up switch or the down switch exclusively This is done through a routine which compares the number represented by the switches to a number which represents only the numbers which would be read if either the up switch or the down switch was depressed. This standard method of comparison locks the system program into a loop until the comparison between the numbers signals the microprocessor that one of the switches has been depressed. Once either the up or down switch is depressed, the system program outputs a code to the display driver port which displays either an increment of one or a decrement of one of the previous number shown on the user display (depending upon which switch the user selected). This is done via the user display register (within the CPU's memory) which contains the information about the user display.

The system program now will accept options from all of the switches except select (since its use is not needed) by the method of exclusive comparison of numbers as previously described. The user may now choose to scroll through the beam selections, as previously described using the up or down switches, or choose to modify one of the user programs.

Once the desired user program is found, the select switch may be depressed. Upon depression of the select switch, the previously stored information about the on/off status of the beams will be output to the latch and the appropriate beams will turn on. The system is now in beam select mode. The on/off status of the first beam (01) may now be changed by depressing the on/off switch or the up or down switches may be depressed causing scrolling through the beams on the user display. The beam which will be changed is the one which is currently shown on the user display at the time of the on/off switch depression. The depression of the on/off switch is read by the microprocessor and directs it to a subroutine in the system program which outputs a code number to the latch which will turn on (or off) the appropriate beam. The beam is turned on by applying a voltage to the base of the transistor which "drives" the light control mechanism coil 38A of the appropriate beam which will saturate the transistor and fully apply voltage to the appropriate magnet coil 38A.

The depression of the program switch will direct the microprocessor to a subroutine in system memory which will return the system to the program select mode, store any beam changes in the location of that particular user program, and display the current user program number on the user display, thus returning the machine to user program status.

SUMMARY, RAMIFICATIONS, AND SCOPE

Thus the reader will see that any of the embodiments of this invention previously described will produce multiple beams of light from a single beam in a convenient, dependable, and repeatable manner and incorporate the following advantages:

Control and ease of adjustment of the number of light beams produced from a single beam.

Intensity of the beams produced being independent of the number of beams desired by the operator.

Ease in changing the setup of an optical system due to the ability of the machine to switch beam locations rapidly.

Great improvement in time of changing the amount of beams split in an optical system.

Reliability of operation due to only two simple moving parts.

Repeatability of operator setups using electronic memory.

Although the preceding descriptions contain many specificities, these should not be construed as limiting the scope of the invention, but merely as detailed illustrations of some of the presently preferred embodiments of the invention. Many shapes of enclosures are possible, but the principle of operation remains the same, and it is this principle of operation of the machinery of the present invention which I desire to patent.

Thus the scope of the invention should be determined by the appended claims and their legal equivalents, rather than by the examples given.

I claim as my invention:

1. A system having a machine for producing and controlling multiple light beams from a single light beam comprising:

a motor for producing rotational motion; a reflecting surface; coupling means to transfer rotational motion of said motor to said reflecting surface; at least one source of light radiation; directing means for directing light from said at least one source of light radiation upon said reflecting surface, said reflecting surface causing light from said source to be displaced outwardly and rotated over 360 degrees repeatedly; a late containing at least two openings disposed so as to intercept said displaced and rotated light as said reflecting surface rotates and allow said displaced and rotated light to pass only through said openings; a base plate upon which elements which comprise said machine for producing multiple beams of light from a single beam may be mounted in a rigid manner; and means for attaching said machine elements to said base plate.

2. The system described in claim 1, further including: light control means for controlling said displaced and rotated light emanating from at least one of said openings in said plate containing at least two openings, wherein said light control means is positioned on said base plate so as to intercept said displaced and rotated light emanating from said at least one of said openings and selectively obstruct or aid the passage of said light emanating from said at least one of said openings beyond said light control means; and means for mounting said light control means to said base plate.

3. The system described in claim 2, wherein said light control means is constructed of an armature with at least one protruding tab, said armature being constructed of permeable metal and having means to affix at least one portion thereof to said base plate, said armature furthermore being formed in such a manner as to, at least in part yield in position to stress and return when said stress is removed; at least one electromagnetic means positioned near said armature in sufficient proximity to cause said protruding tab, at least in part, to yield in position when electrical energy is applied to said electromagnetic means; means to limit yielding in position of said protruding tab produced by said electromagnetic means; electronic control means for selectively applying or removing electrical energy to said at least one electromagnetic means; and means to mount said electronic control means to said machine.

4. The system described in claim 1, wherein said directing means directs said displaced and rotated light which has passed through at least one of said openings in said plate containing at least two openings to a convenient position by disposing said directing means so as to intercept said displaced and rotated light which has passed through said at least one of said openings; said system further including means for mounting said directing means to said base plate.

5. The system described in claim 1, further including: a covering which allows only specific wavelengths of light to pass through itself; and means to mount said covering to said machine.

6. The system described in claim 1, further including: a covering which allows many wavelengths of light to pass through itself; and means to mount said covering to said machine.

7. The system described in claim 1, further including: enclosure means to enclose said at least one source of light radiation; means to mount said at least one source of light radiation within said enclosure means; and means to attach said enclosure means to said machine.

8. The system described in claim 1, further including: enclosure means to enclose an underside of said machine; and means to attach said enclosure means to said machine.

9. The system described in claim 1, wherein said reflecting surface is constructed to have multiple facets; and wherein said directing means directs light from said at least one source of light radiation with angular displacement of less than 360 degrees repeatedly.

10. The system of claim 1, wherein a refracting surface is used instead of said reflecting surface.

11. The refracting surface of claim 10, wherein said refracting surface is constructed to have multiple facets.

* * * * *

UNITED STATES PATENT AND TRADEMARK OFFICE
CERTIFICATE OF CORRECTION

PATENT NO. : 4,993,793

DATED : February 19, 1991

INVENTOR(S) : Michael B. Fowers

It is certified that error appears in the above-identified patent and that said Letters Patent is hereby corrected as shown below:

Column 14, line 65, claim 1, "late" should read --plate--.

Signed and Sealed this

Second Day of July, 1991

Attest:

HARRY F. MANBECK, JR.

Attesting Officer

Commissioner of Patents and Trademarks